United States Patent
Wang et al.

(10) Patent No.: US 8,165,175 B2
(45) Date of Patent: Apr. 24, 2012

(54) GAP SUPPORT MEASURING METHOD

(75) Inventors: Bang Wang, Singapore (SG); Hong Tat Toh, Singapore (SG); Koh Wei Chien, Singapore (SG); Takahisa Aoyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 390 days.

(21) Appl. No.: 12/602,149

(22) PCT Filed: May 30, 2008

(86) PCT No.: PCT/JP2008/001380
§ 371 (c)(1),
(2), (4) Date: Nov. 28, 2009

(87) PCT Pub. No.: WO2008/149534
PCT Pub. Date: Dec. 11, 2008

(65) Prior Publication Data
US 2010/0190487 A1    Jul. 29, 2010

(30) Foreign Application Priority Data
May 31, 2007    (JP) .................................. 2007-145901

(51) Int. Cl.
*H04J 3/12* (2006.01)
*H04W 36/00* (2009.01)
(52) U.S. Cl. ..................... 370/528; 370/331; 370/335
(58) Field of Classification Search .................. 370/331, 370/335, 522, 528, 529, 470
See application file for complete search history.

(56) References Cited

U.S. PATENT DOCUMENTS

| | | | |
|---|---|---|---|
| 6,671,267 B1 | 12/2003 | Yano | |
| 6,785,250 B2 | 8/2004 | Vayanos | |
| 6,810,019 B2 | 10/2004 | Steudle | |
| 6,975,858 B2 | 12/2005 | Cao | |
| 7,359,355 B2 * | 4/2008 | Faerber | 370/332 |
| 2002/0013156 A1 | 1/2002 | Yamamoto | |
| 2003/0026235 A1 | 2/2003 | Vayanos | |
| 2005/0260992 A1 * | 11/2005 | Moon et al. | 455/436 |
| 2006/0087980 A1 | 4/2006 | Ikeda | |
| 2008/0095132 A1 * | 4/2008 | Lindoff et al. | 370/342 |
| 2008/0132234 A1 * | 6/2008 | Gilliland | 455/436 |

(Continued)

FOREIGN PATENT DOCUMENTS
EP    1 626 535    2/2006
(Continued)

OTHER PUBLICATIONS
International Search Report dated Jul. 29, 2008.
(Continued)

*Primary Examiner* — Brian Nguyen
(74) *Attorney, Agent, or Firm* — Dickinson Wright PLLC

(57) ABSTRACT

Disclosed is a gap support measuring method which performs autonomous gap allocation without lowering the data transfer rate or the throughput. ST301 acquires various kinds of parameters decided by a network so as to execute a gap support measurement task. ST302 checks the current time and starts the gap support measurement task when the current time has become Ts. ST303 judges whether CQI measured by a terminal is lower than a threshold value. ST304 judges whether the threshold value should be updated. ST306 decides the gap length according to the remaining gap length and the remaining time and performs measurement within the gap. ST307 judges whether the measurement is complete. ST308 checks whether the total of the gaps exceed the entire gap length Tg.

15 Claims, 11 Drawing Sheets

U.S. PATENT DOCUMENTS

| | | | |
|---|---|---|---|
| 2008/0188266 A1* | 8/2008 | Carter et al. | 455/561 |
| 2008/0248800 A1* | 10/2008 | Jalloul | 455/433 |
| 2008/0270866 A1* | 10/2008 | Choi et al. | 714/748 |

FOREIGN PATENT DOCUMENTS

| | | |
|---|---|---|
| JP | 2001-069075 | 3/2001 |
| JP | 2004-535735 | 11/2004 |
| JP | 2006-060809 | 3/2006 |
| JP | 2006-279635 | 10/2006 |
| WO | 99/49609 | 9/1999 |
| WO | 2005/034555 | 4/2005 |

OTHER PUBLICATIONS

3GPP TSG-RAN WG2 (Radio) Meeting #54, Aug. 28-Sep. 1, 2006, Ericsson, R2-062134, "Idle Gaps for Handover Measurements in E-UTRAN," Aug. 2006, 5 pages total.

3GPP TSG-RAN WG2 Meeting #54, Aug. 28-Sep. 1, 2006, Qualcomm, R2-062359, "Measurement Gap Scheduling," Aug. 2006, pp. 1-3.

* cited by examiner

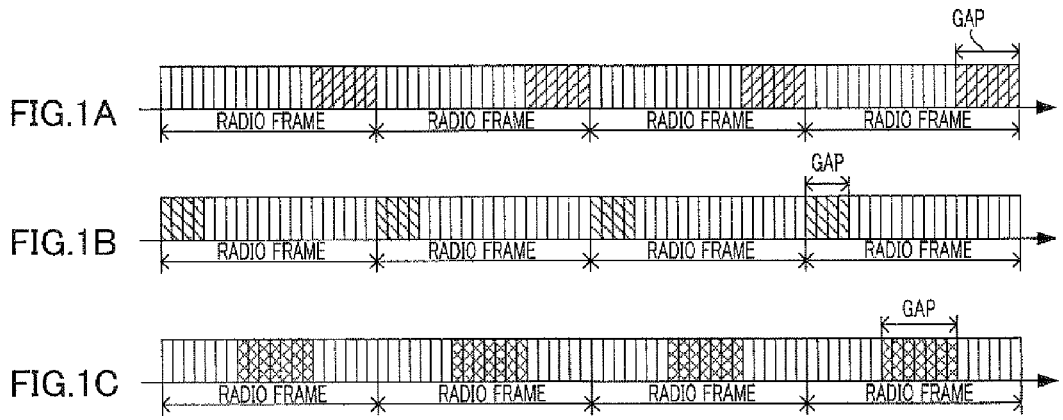
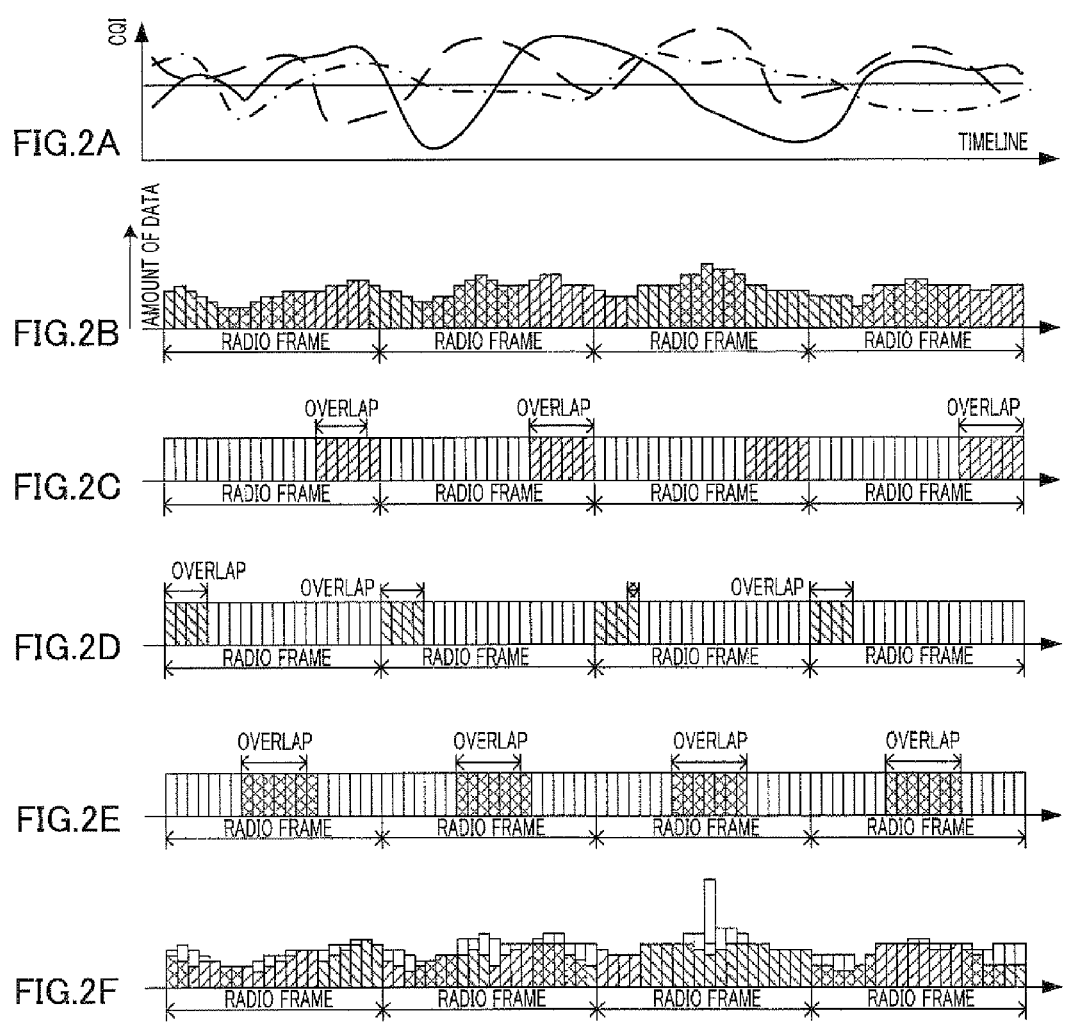

GAP SUPPORT MEASURING METHOD

TECHNICAL FIELD

The present invention relates to a gap assisted measurement method for inter-frequency measurement or inter-RAT measurement in a cellular radio communication system that uses shared radio resource allocation. More particularly, the present invention relates to a gap assisted measurement method in an LTE cellular radio communication system.

BACKGROUND ART

In a cellular radio communication system, when a terminal moves from the cell currently providing services (hereinafter, "serving cell"), to another cell or when the network needs to intentionally re-connect the terminal to another cell to balance network load among cells, handover is necessary to change the serving base station to which this terminal is connected, to another base station. The cell to which a terminal is currently connected and which provides services is also referred to as a "source cell." The cell to which a terminal prepares to connect is referred to as a "target cell."

Before a handover, a terminal generally measures channel qualities for candidate cells, and selects, for example, the cell of the best channel quality as the target cell. The candidate cells are also referred to as "neighboring cells" of the source cell.

There are three types of handover, including: intra-frequency handover; inter-frequency handover; and inter-RAT handover. Intra-frequency handover refers to handing over a terminal to a target cell that employs the same radio access technology ("RAT") and frequency band as the source cell. Further, inter-frequency handover refers to handing over a terminal to a target cell that employs the same radio access technology as the source cell and a different frequency band from the source cell. Furthermore, inter-RAT handover refers to handing over a terminal to a target cell that employs a different radio access technology from the source cell. In a cellular radio communication system accommodating cells of various radio access technologies and various carrier bands, the three types of handover enable terminals to move while receiving services.

In association with the three types of handover, measurement performed for handover can also be classified into three types, including: intra-frequency measurement for intra-frequency handover; inter-frequency measurement for inter-frequency handover; and inter-RAT measurement for inter-RAT handover. Intra-frequency measurement refers to measuring those neighboring cells that employ the same RAT and the same carrier frequency as the source cell. Further, inter-frequency measurement refers to measuring the neighboring cells that employ the same RAT as the source cell and a different frequency band from the source cell. Furthermore, inter-RAT measurement refers to measuring the neighboring cells that employ a different RAT from the source cell.

For intra-frequency measurement, a terminal does not need to tune its receiver to a frequency other than the frequency of the serving cell to measure neighboring cells. For inter-frequency and inter-RAT measurements, there are the following two approaches.

As the first approach, if a terminal has a function for supporting reception from two or more frequency bands at the same time, the terminal can use one of receiving circuits to measure another cell that employs a different carrier frequency or different RAT, and use the other receiving circuit to tune its frequency to the frequency of the serving cell to continue data transmission in the serving cell.

As the second approach, if a terminal does not support reception from a plurality of frequency bands at the same time, the terminal needs to tune its receiving circuit from the frequency of the source cell to another frequency of a neighboring cell or to a frequency of another RAT, to perform inter-frequency or to perform inter-RAT measurement, and needs to re-tune the receiving circuit back to the frequency of the source cell after measurement in order to continue data transmission in the source cell. This procedure for a terminal that does not support reception from a plurality of frequency bands at the same time to perform inter-frequency measurement or inter-RAT measurement requires that a terminal sets an idle period to continue data transmission in the serving cell. Furthermore, in such an idle period, it is assumed that the serving base station and the terminal are synchronized so as not to transmit data from the serving base station to the terminal.

As the technology for generating idle periods in the current, so-called third generation cellular radio communication system, which is referred to as a "universal mobile telecommunications system ("UMTS")," compressed mode is known. In compressed mode, the idle periods (hereinafter, also referred to as "gaps") for inter-frequency measurement or inter-RAT measurement, are allocated by the serving base station to a terminal such that the terminal can perform inter-frequency measurement and inter-RAT measurement during the gaps. Compressed mode is generally executed in downlink or in downlink and uplink at the same time. Further, in UMTS, a frame is formed with 15 time slots, and part of the time slots are used as gaps for inter-frequency measurement or inter-RAT measurement, while some of the other time slots are used for data transmission. Furthermore, UMTS employs W-CDMA (Wideband-Code Division Multiple Access) as a multiple access technology, and therefore, a technology of, for example, reducing the spreading factor of data to be transmitted in compressed mode, is introduced such that the data transmission rate of a terminal in compressed mode can be maintained the same as in non-compressed mode. At this time, transmission power is increased upon data transmission in time slots without gaps.

Here, a case will be explained where only a single gap pattern sequence of predetermined gap pattern sequences for gap allocation in LTE (Long Term Evolution) is used. Non-Patent Document 1 discloses a single gap pattern sequence supporting both inter-frequency measurement and inter-RAT measurement, and discloses reporting the gap pattern sequence by layer 3 radio resource control ("RRC") signaling which is transmitted from the base station to a terminal.

Further, Non-Patent Document 2 discloses signaling a large gap by layer 2 media access control ("MAC") signaling which is transmitted by the base station to a terminal. The techniques disclosed in Non-Patent Document 1 and Non-Patent Document 2 are kind of simplifications of the gap pattern sequences used in compressed mode in UMTS.

FIG. 1 shows examples of gap pattern sequences in compressed mode. FIG. 1A shows gap pattern sequence 1, FIG. 1B shows gap pattern sequence 2 and FIG. 1C shows gap pattern sequence 3. In UMTS, several gap pattern sequences are defined. When a gap pattern sequence is activated, a terminal transitions to a certain gap according to the predetermined time slots specified by the gap pattern gap sequence. In UMTS, it is possible to "reduce a spreading factor" and "increase transmission power" such that the data transmission rate of a terminal in compressed mode can be maintained.

By using only a single gap pattern sequence or several predetermined gap pattern sequences for inter-frequency measurement or (gap assisted) measurement using gaps such as inter-RAT measurement for terminals that support reception from a single frequency band at a given time, it is possible to facilitate processing in compressed mode. However, there is the following problem if such gap pattern allocation in UMTS is directly applied to a cellular radio communication system that performs shared radio resource allocation in LTE.

In LTE, a packet scheduler (hereinafter "channel-aware packet scheduler") that manages radio quality of channels and schedules transmission and reception of data, performs shared radio resource allocation not only for terminals that receive non-real time services which allow a comparatively long delay time, but also for terminals that receive real time services which allow a comparatively short delay time. The channel-aware packet scheduler selects a terminal when channel quality of the serving cell is high and before the packet delay time required for real time services expires, and allocates radio resources for data transmission.

Assuming that shared radio resource allocation is performed by a channel-aware packet scheduler as, for example, in LTE, if a fixed gap pattern is applied to inter-frequency measurement or inter-RAT measurement, a terminal in compressed mode that receives optimal channel quality from the serving cell is scheduled for data transmission in some subframes. However, there is a high possibility that this terminal cannot transmit data because these subframes have already been allocated as gaps for measurement by a predetermined gap pattern sequence. As a result, the data transmission rate of the terminal in compressed mode decreases, thereby decreasing throughput.

To minimize the influences upon the data transmission rate and throughput of the terminal, it is possible to apply autonomous gap allocation for allocating gaps to the terminal, only in a period in which the channel quality of the serving cell is low or in a period in which this terminal is less likely to be scheduled for data transmission. In autonomous gap allocation, the base station and a terminal need to share gap-related information such that the base station does not schedule data transmission for a terminal when the terminal is in a gap.

In case where a channel-aware packet scheduler performs shared radio resource allocation, when only some predetermined gap pattern sequences for gap assisted measurement are used, there is a problem that the data transmission rate and throughput for both terminals and the base station decrease as described above. Here, in a predetermined gap pattern sequence, the position and the length of a gap are determined in advance. Therefore, there is a possibility that a predetermined gap overlaps the period in which this terminal cannot be scheduled due to a predetermined gap even if this terminal that transmits data is subjected to scheduling. FIG. 2 shows a decrease of throughput in case where predetermined gaps overlap periods of high channel quality. FIG. 2A shows channel qualities ("CQI's") of three terminals, and, for example, the solid line represents the channel quality of terminal A, the dotted line represents the channel quality of terminal B and the dashed line represents the channel quality of terminal C.

FIG. 2B shows a result of performing scheduling based on channel quality shown in FIG. 2A. Here, the vertical axis represents the amount of data. Further, FIGS. 2C to E represent gap pattern sequences 1 to 3, respectively, and gap pattern sequence 1 is allocated to terminal A, gap pattern sequence 2 is allocated to terminal B and gap pattern sequence 3 is allocated to terminal C.

FIG. 2F shows a scheduling result in case where the gap pattern sequences shown in FIGS. 2C to E are used. FIG. 2F shows outlined portions in which throughput decreases and FIG. 2B shows decreases from the amounts of data in case where there are no gaps.

Further, the terminal may allocate gaps autonomously. As a specific method for autonomous gap allocation, it is possible to use two CQI values of an instantaneous CQI value and an average CQI value, and two thresholds. The instantaneous CQI value represents the channel quality of the measured serving cell, and the average CQI value is the average of instantaneous CQI values over a certain period. The two thresholds of threshold A and threshold B are thresholds for determining a start and end of measurement mode (i.e. compressed mode), and threshold A is set lower than threshold B.

Autonomous gap allocation is performed in the following steps. A terminal measures an instantaneous CQI value and updates an average CQI value continuously. Further, the terminal reports the measured instantaneous CQI value to the base station on a regular basis to facilitate the operation of the above-described channel-aware packet scheduler. If the average CQI value that is updated in the terminal is lower than threshold A, the terminal starts measurement mode. In measurement mode, if the measured instantaneous CQI value is lower than the average CQI value, then the terminal generates gaps for inter-frequency measurement or inter-RAT measurement. If the instantaneous CQI value is higher than the average CQI value, the terminal may transmit the instantaneous CQI value to the base station such that the terminal can continue data transmission. The terminal finishes measurement mode if the average CQI value is higher than threshold B.

As described above, the terminal can report to the base station that gaps have been allocated, by not transmitting CQI's. That is, depending on whether or not CQI's are transmitted, a terminal and base station can share gap allocation information.

Non-Patent Document 1: "Idle Gaps for Handover Measurements in E-UTRAN," Ericsson, R2-062134, August 2006

Non-Patent Document 2: "Measurement Gap Scheduling," Qualcomm, R2-062359, August, 2006

DISCLOSURE OF INVENTION

Problems to be Solved by the Invention

However, the above-described method for autonomous gap allocation has the following problems. The first problem is that the timings a terminal starts and finishes measurement mode are unpredictable. This is because of the characteristics of a time-varying channel in which the average CQI value may go above and below two thresholds frequently. For example, when a terminal is in a short fading state, there are cases where short measurement mode is set in the terminal. That is, when the average CQI value of a terminal is lower than threshold A, measurement mode is started in the terminal. However, the terminal finishes measurement mode very quickly because a fading period is short. In such a case, measurement and gaps generated in measurement mode are not suitable for the terminal to perform inter-frequency measurement or inter-RAT measurement.

The second problem is that there are cases where the gaps generated in measurement mode are very long and may become longer than gaps required to perform measurement. This is also due to the characteristics of a time-varying channel in which measurement mode is long and the period in which the instantaneous CQI value is lower than the average CQI value becomes very long. As a result, gaps are used more than necessary, thereby causing a decrease in the data transmission rate, a decrease of throughput and inefficient power consumption in the terminal.

It is therefore an object of the present invention to provide a gap assisted measurement method for performing autonomous gap allocation without decreasing the data transmission rate, thereby decreasing throughput.

Means for Solving the Problem

The gap assisted measurement method according to the present invention includes: acquiring a gap assisted measurement task that is transmitted from a base station apparatus and that commands a gap assisted measurement method; starting gap mode according to a starting time of the gap assisted measurement task included in the gap assisted measurement task and a duration of the gap assisted measurement task; and generating, in the started gap mode, a gap based on a total length of gaps included in the gap assisted measurement task.

ADVANTAGEOUS EFFECTS OF INVENTION

According to the present invention, it is possible to perform autonomous gap allocation without decreasing the data transmission rate, thereby decreasing throughput.

BRIEF DESCRIPTION OF DRAWINGS

FIG. 1 shows an example of a gap pattern sequence in compressed mode;

FIG. 2 shows a decrease of throughput in case where a period of high channel quality and a predetermined gap overlap;

BEST MODE FOR CARRYING OUT THE INVENTION

Embodiments of the present invention will be explained below in detail with reference to the accompanying drawings.

Embodiment 1

Figure 3:
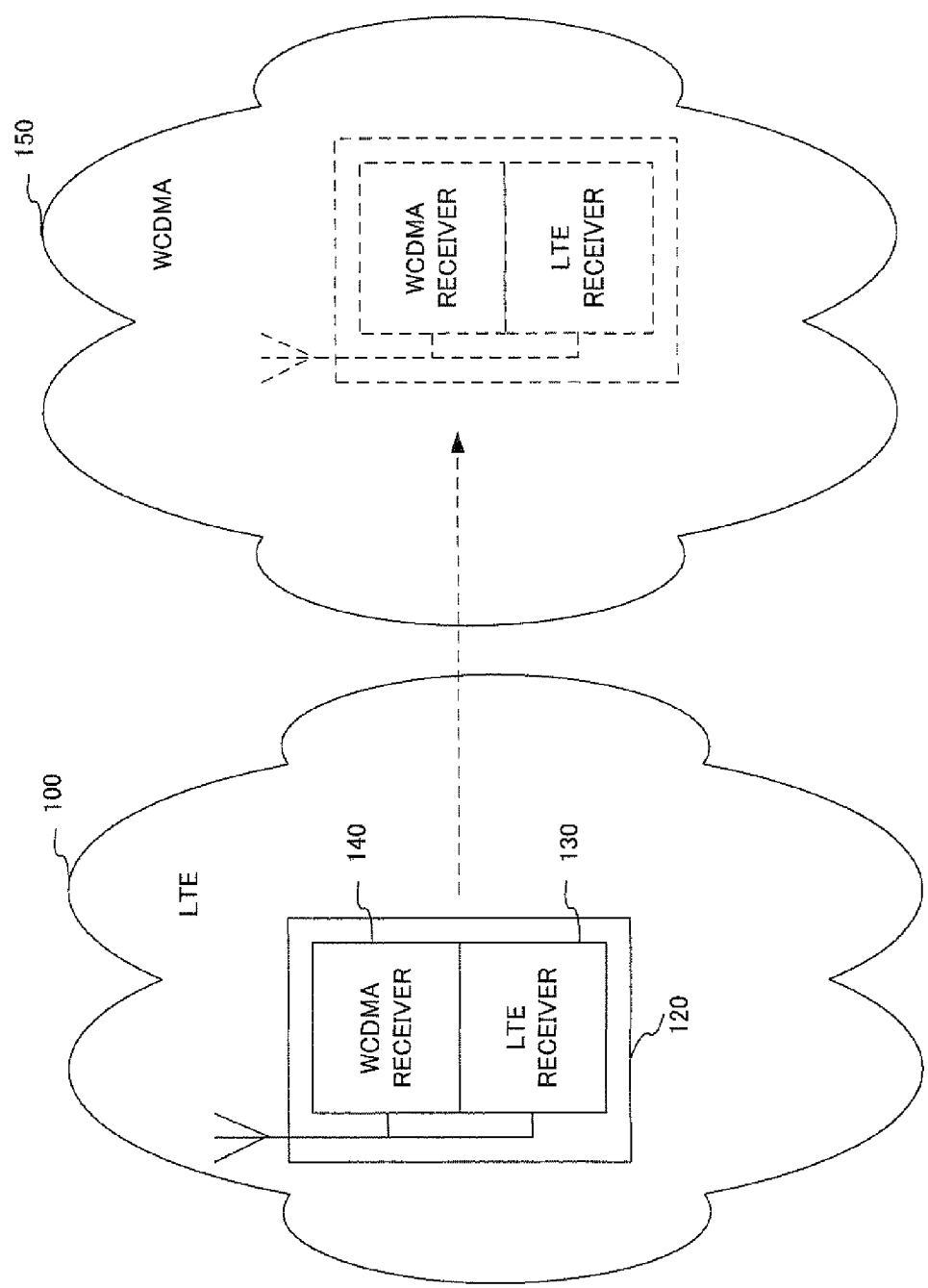
FIG. 3 shows that a terminal moves to a cell of a different RAT.

FIG. 3 shows that a terminal moves to a cell of a different RAT. To be more specific, a terminal moves from serving cell 100 of LTE to cell 150 of WCDMA. Terminal 120 shown in FIG. 3 has two receivers in order to support LTE and WCDMA. That is, when terminal 120 is in the LTE cell, terminal 120 uses LTE receiver 130 to receive LTE signals. Further, after terminal 120 moves to a WCDMA cell, terminal 120 uses WCDMA receiver 140.

Further, a terminal shown in FIG. 3 may be equipped with three or more receivers such as an LTE receiver, a WCDMA receiver, and a GSM receiver. Furthermore, although a case has been described where the terminal shown in FIG. 3 has one antenna, this terminal may have a plurality of antennas.

The gap assisted measurement task (hereinafter, also simplified as "task") is allocated because the channel quality of a terminal becomes poor for a certain period or the network reconnects the terminal from the serving cell to another cell to balance network load.

A gap assisted measurement task can include various kinds of information and include the following parameters that define gap mode, the total length of gaps generated in gap mode and the operation of a measurement task. That is, the following parameters include: a task starting time (hereinafter abbreviated as "Ts") that represents the starting time of gap mode; a task duration (hereinafter abbreviated as "Td") that represents the total length of gaps in gap mode; a task total gap length (hereinafter abbreviated as "Tg") that represents the total length of gaps in gap mode; and a task operation (hereinafter abbreviated as "To") that represents the operation of a gap assisted measurement task.

In the above parameters, Td must be equal to or greater than Tg at all times. That is, Td=Tg must be satisfied for all gap assisted measurement tasks. The unit of the parameter "Ts" may be the absolute time, or may be a counter used as an index given to a radio frame. In case where the parameters "Td" and "Tg" are the absolute time, they are represented by units such as milliseconds. In case where Td and Tg are counters used as indices given to radio frames, they are represented by units such as transmission time intervals (or equivalently subframes). Hereinafter, the unit of Ts will be explained as indices given to subframes, such as 1, 2, 3 . . . , and the units of Td and Tg will be explained as subframes (for example, subframes of one millisecond).

Further, during a Td period, it is possible to change the operations of a terminal and network. For example, in case where a distributed approach for allocating subcarriers distributed in the frequency domain is adopted for the radio resource allocation scheme during the Td period, the resources required for channel quality reports decrease. By contrast with this, in case where a localized approach for allocating subcarriers concentrated in the frequency domain is adopted for the radio resource allocation scheme during the Td period, a great number of channel quality reports need to be transmitted. This because, while the average value of received quality in the frequency domain needs to be transmitted with the distributed approach, the values of received quality need to be transmitted using units of frequencies of some degrees. Therefore, even when the localized approach is used, it is possible to use the distributed approach only during the Td period.

The parameter "To" represents the relevance to another gap assisted measurement task, and is used to command the method of operating this gap assisted measurement task. To be more specific, this parameter shows whether to perform this gap assisted measurement task after another gap assisted measurement task is finished, perform this gap assisted measurement task by forcibly terminating another gap assisted measurement task or perform this gap assisted measurement task in parallel with another gap assisted measurement task.

The gap assisted measurement task is determined based on, for example, measurement-related information including measurement identification information and measurement configurations such as measurement purpose, the amount of measurement, measurement report decision criteria and measurement report quality. The measurement identification information is an index given to measurement-related information to identify the measurement-related information. The measurement configurations are used to specify the measurement target in a gap and a measurement method. Further, the measurement configurations are disclosed in, for example, "UMTS Radio Resource Control ("RRC") Protocol Specification" of 3GPP TS 25.331, v7.0.0, 2006.03.

Figure 4:
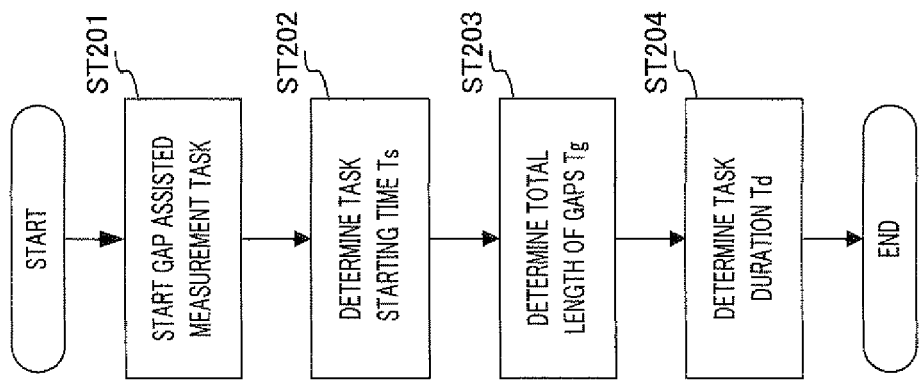
FIG. 4 is a flowchart showing steps of determining various kinds of parameters of a gap assisted measurement task in a network.

FIG. 4 is a flowchart showing the steps of determining various kinds of parameters for a gap assisted measurement task in the network. In step (hereinafter abbreviated as "ST") 201, a gap assisted measurement task is started, and, in ST 202, task starting time Ts indicating the timing for making a terminal execute the gap assisted measurement task, is determined.

In ST 203, total gap length Tg indicating the total length of gaps in gap mode is calculated from, for example, the measurement time required to finish the gap assisted measurement task, and, in ST 204, task duration Td of gap mode is determined such that the gap assisted measurement task can be executed in a state where QoS is satisfied. Here, task duration Td is longer than total length of gaps Tg, and needs to satisfy QoS within the time subtracting the total length of gaps Tg from task duration Td.

Figure 5:
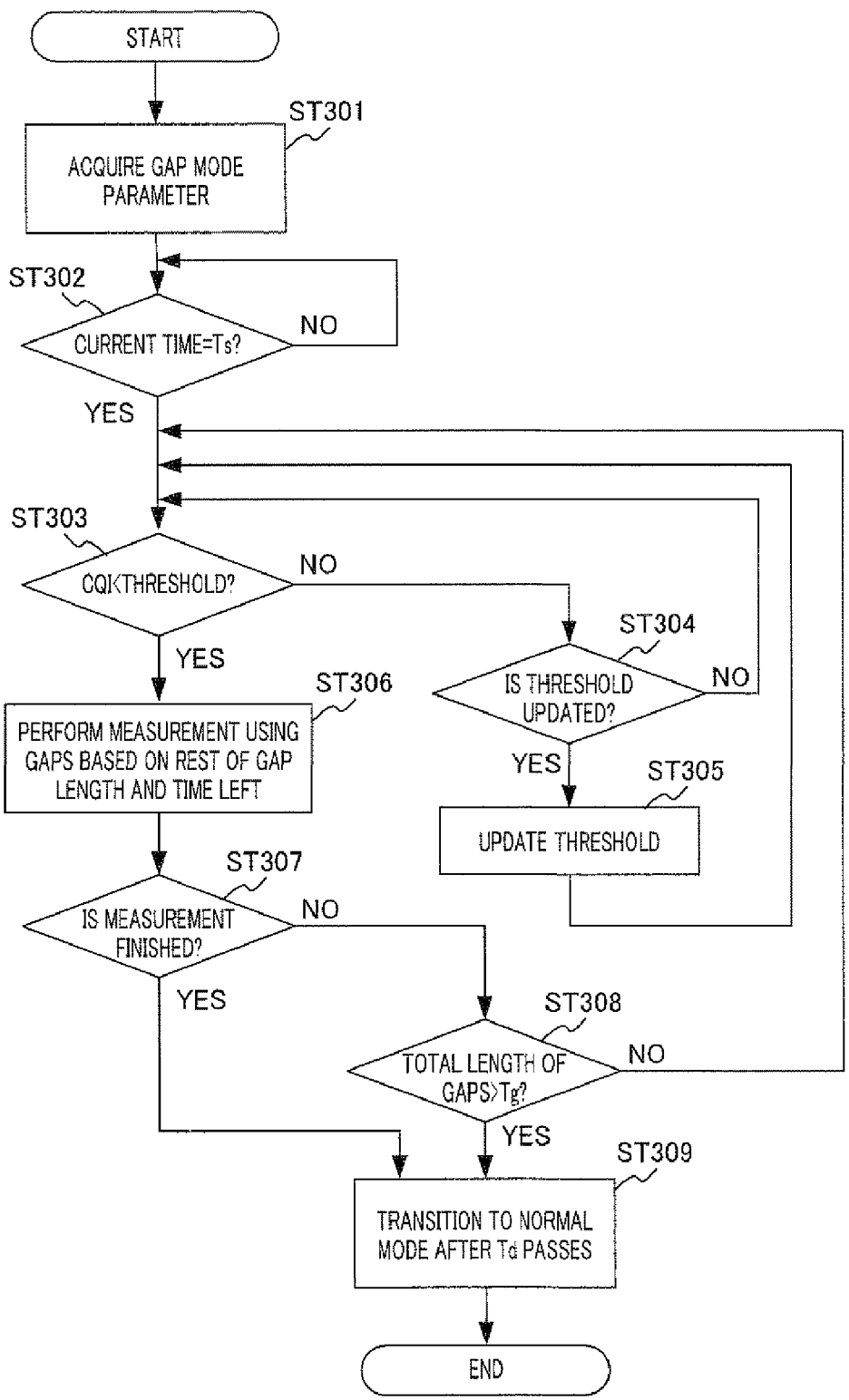
FIG. 5 is a flowchart showing the operation of a terminal that executes a gap assisted measurement task according to Embodiment 1 of the present invention.

Next, the operation of a terminal that executes a gap assisted measurement task will be explained using FIG. 5. In FIG. 5, in ST 301, various kinds of parameters determined by the network to execute the gap assisted measurement task are acquired and, in ST 302, the current time is checked and the gap assisted measurement task is started when the current time comes to Ts.

In ST 303, whether or not a CQI measured by the terminal is lower than a threshold is decided, and, if the CQI is lower than a threshold (Yes), the step proceeds to ST 306 and, if the CQI is higher than the threshold (No), the step proceeds to ST 304. Here, the threshold may be reported by broadcast information, reported by a measurement control message or held by the terminal in advance.

In ST 304, whether or not it is necessary to update the threshold is decided. For example, if a CQI is continuously high, the terminal cannot generate a gap and a state where measurement is not possible, continues. Therefore, the threshold is updated to a higher value such that a gap can be generated in a reliable manner. By contrast with this, if a CQI is continuously low, the threshold is updated to a lower value. As for information about updating, a notice may be provided by means of broadcast information, may be provided by means of a measurement control message or may be held by the terminal in advance. As a result of decision in ST 304, if the threshold needs to be updated (Yes), the step proceeds to ST 305 to update the threshold and returns to ST 303. Further, if the threshold does not need to be updated (No), the step returns to ST 303.

In ST 306, the gap length is determined based on the rest of the gap length, the time left and so on, and measurement is performed within this gap. In ST 307, whether or not measurement is finished is decided, and, if measurement is finished (Yes), the step proceeds to ST 309 to make mode transition to normal mode after Td passes and finish the gap assisted measurement task. If measurement is not finished (No), the step proceeds to ST 308.

In ST 308, whether or not all of previous gaps exceed Tg indicating the total length of gaps is checked, and, if the total of gaps exceeds the total length of gaps (Yes), the step proceeds to ST 309 to make mode transition to normal mode after Td passes and finish the gap assisted measurement task. Further, if all of previous gaps do not exceed the total length of gaps (No), the step returns to ST 303.

Furthermore, a signaling message for allocating to a terminal a gap assisted measurement task that includes various kinds of parameters determined by the network, is transmitted from the network to the terminal through a dedicated channel. In case where the configuration of measurement-related information to which an index is given by measurement identification information is set in a terminal in advance, and does not need to be changed, it is possible to reduce messages to transmit by transmitting only this index.

Next, a method of setting various kinds of parameters will be explained in detail. First, "start" is set to the parameter "To." Here, the time the network determines to transmit a gap assisted measurement task is represented by "T."

Some delay and delay variations are anticipated when a terminal receives a task from the network, and therefore the network assumes a signaling delay of a task and sets the value of Ts using current time T and delay time Tdelay. Consequently, an indispensable condition for setting the value of Ts is Ts>T+Tdelay. For example, if T=10 and Tdelay=4, Ts=15 is an adequate value.

Further, the network determines Tg before determining Td. The value of Tg is calculated based on the minimum time to measure the cell, the number of cells to measure, the measurement purpose related to the number of times to measure a cell, and the amount of measurement. Further, finishing measurement of a cell adequately requires a minimum measurement duration represented by "M1." Here, N1 represents the number of neighboring cells measured in a gap assisted measurement task, and N2 represents the number of times the neighboring cells are measured. Accordingly, the value of Tg must be equal to or greater than the product of M1, N1 and N2. That is, Tg=M1×N1×N2. For example, if M1=2, N1=20 and N2=2, Tg=2×20×2=80. To minimize the power consumption and measurement time, Tg=M1×N1×N2 is set, and, if M1=2, N1=20 and N2=2, Tg=80 holds. In this way, Tg is set such that all of neighboring cells can be measured at a certain level of reliability.

After setting the value of Tg, the network sets an adequate value for Td that is equal to or greater than Tg. If the network does not require the measurement result urgently from a terminal, comparatively long Td may be set compared to Tg. For example, Td=6×Tg may be set, and Td=6×80=480 holds in the above example of the numerical value. On the other hand, if the network requires a measurement result urgently from a terminal, comparatively short Td may be set. For example, Td=2×Tg may be set, and Td=2×80=160 holds in the above example of the numerical value. In the above method of a gap assisted measurement task, it is possible to transmit a simple gap pattern sequence of a single long gap by setting Td=Tg. Further, the value of Td is preferably greater than Tg in the range equal to or less than ten times as much as the value of Tg.

The above parameter setting method is applicable to the concept of a predetermined gap pattern sequence that is used in UMTS. Using the variable described above, the network sets "To" as "start" and sets Ts=4. Taking into account a predetermined gap pattern sequence that includes a gap of 2 subframes every 10 subframes, the length of a gap pattern sequence is 400 subframes. This indicates that the total length of gaps in this gap pattern sequence is 400/10×2=80 subframes. Further, this indicates that the gap pattern sequence covers 400 subframes. Accordingly, the network can set Tg=80 subframes and Td=400 subframes.

Further, to set the above parameter (i.e. task duration Td), it is better to take into account the current situation of network load, the delay requirement for handover, the instantaneous channel conditions of a terminal and its QoS requirements. The operation of gap allocation taking these into account will be explained.

Figure 6:
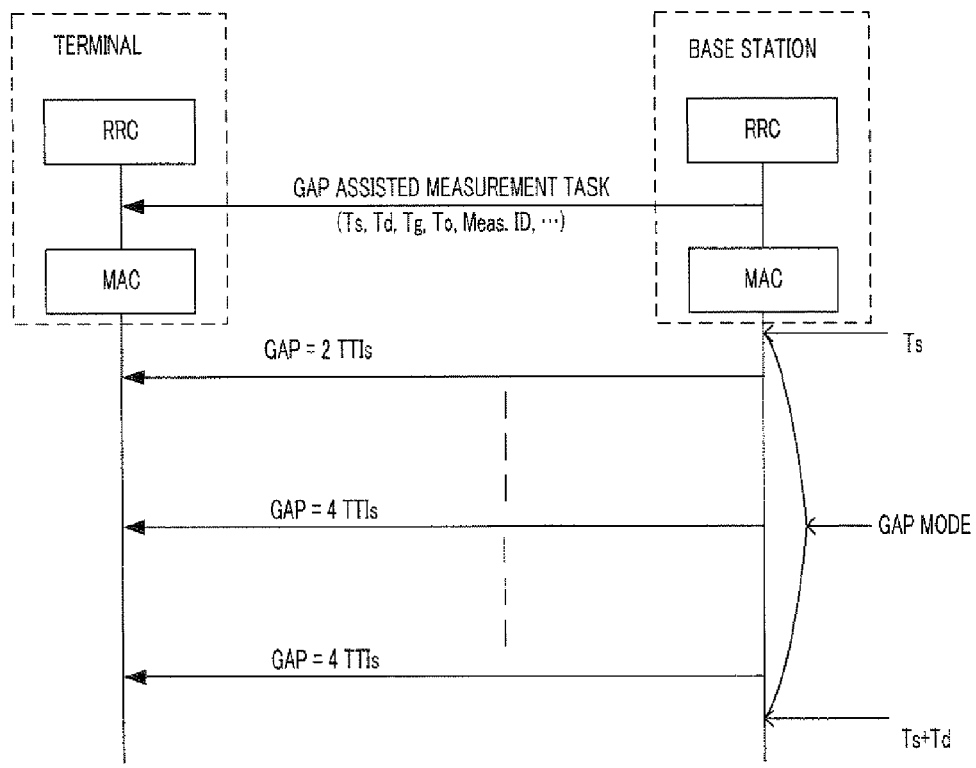
FIG. 6 shows layer 2 and layer 3 signaling.

First, the network may allocate gaps generated by a gap assisted measurement task by variable gap allocation or fixed gap allocation. Here, a case will be explained where the network performs variable gap allocation. The network needs to signal each allocating gap to a terminal. By commanding allocation of individual gaps through layer 2 signaling, where necessary, it is possible to realize gap allocation matching the situation of the network. This is shown in FIG. 6, and layer 3 RRC signaling is used to set parameters of the gap assisted measurement task and layer 2 MAC signaling is used to set individual gaps.

Next, a case will be explained where the network performs fixed gap allocation. Based on the above allocated parameters and some other limits such as each gap length and the inter-gap distance, the network allocates a fixed gap pattern that is formed with a series of gaps of an equal length separated by equal inter-gap distances. This fixed gap pattern is suitable for real time services in which persistent scheduling is performed by a packet scheduler installed in a MAC of the base station, and therefore may be allocated by network layer 2 MAC signaling or layer 3 RRC signaling.

Figure 7:
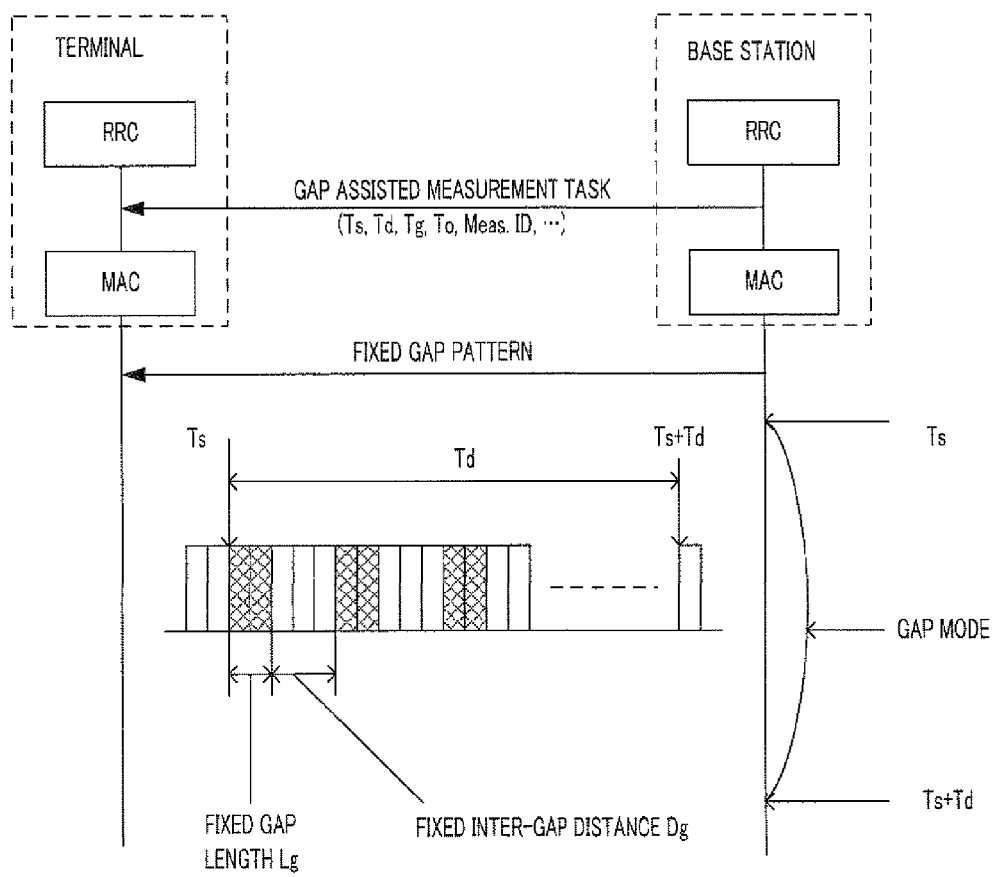
FIG. 7 shows layer 2 and layer 3 signaling.

FIG. 7 illustrates how layer 2 MAC signaling or layer 3 RRC signaling can be used to signal a fixed gap pattern based on the allocated task that includes given parameters. It can be seen that the first gap starts at time Ts and the gap pattern does not exceed task duration Td, and therefore such layer 2 MAC signaling only needs to use two parameters to command fixed gap patterns, such as the fixed gap length ("Lg") and fixed inter-gap distance ("Dg"). Further, compared with the autonomous gap allocation by base station layer 2, this fixed gap pattern reduces the signaling overhead of layer 2, and is the most suitable for those real time services in which persistent scheduling is performed. The packet scheduler can set a fixed gap pattern such that gaps are provided only in the DRX (Discontinuous Reception) period of real time services in which persistent scheduling is performed.

Figure 8:
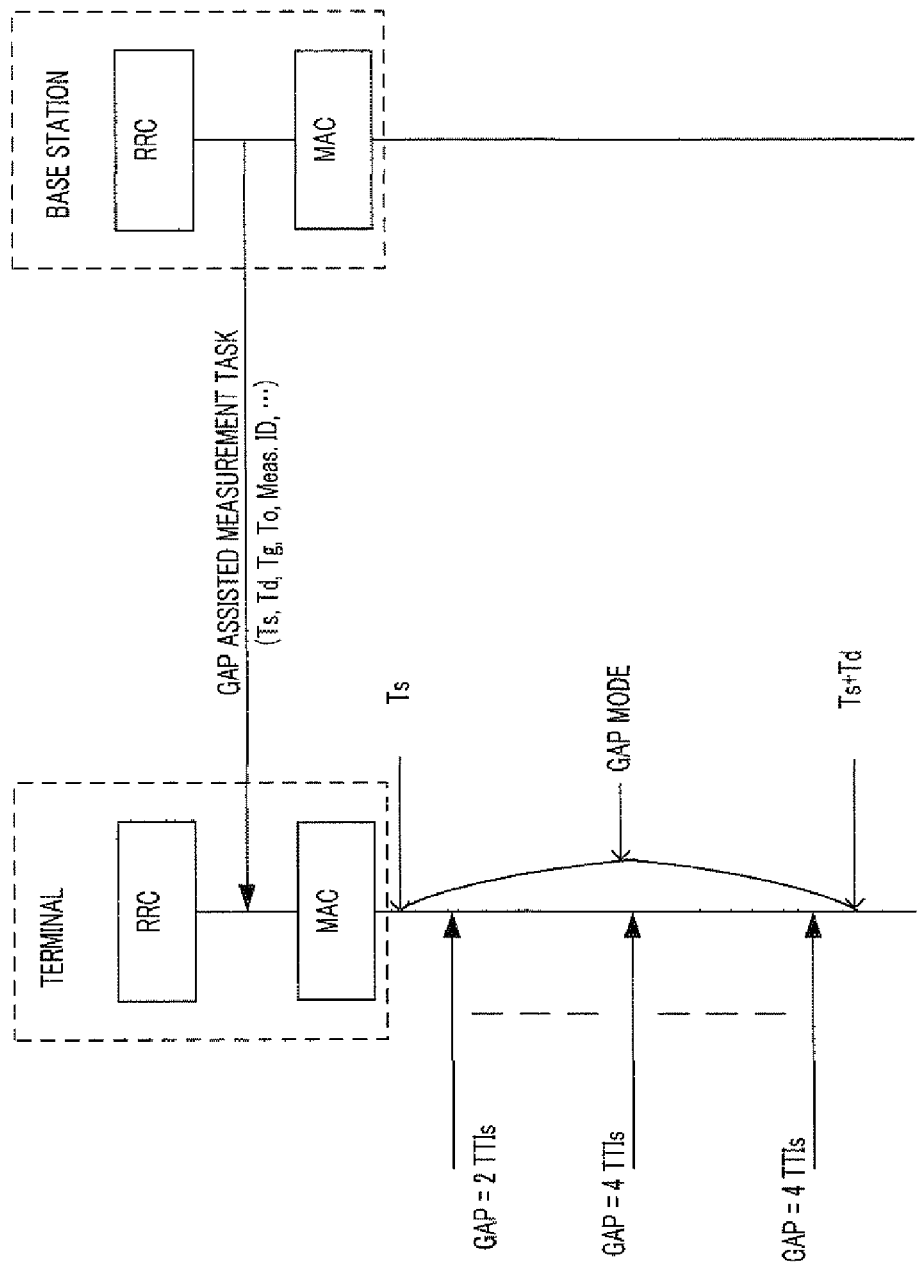
FIG. 8 shows layer 3 signaling.

Further, with the present embodiment, it is also possible to determine whether to perform either variable gap allocation or fixed gap allocation of gaps generated by a gap assisted measurement task, using services used by the terminal or the radio state. Furthermore, if the terminal generates the gaps by itself without an initiative of the network, the network does not need to perform signaling regarding allocation of the individual gaps. This is shown in FIG. 8, and, here, only signaling to transmit a gap assisted measurement task is required. Further, this signaling may be layer 3 RRC signaling.

With the present embodiment, when a terminal receives a gap assisted measurement task, the terminal transitions to gap mode that provides length Td from time Ts, and generates gaps of a total length equal to or less than Tg in this gap mode.

Generally, a terminal can generate gaps when the channel quality of the serving cell is lower than the channel quality required by non-real time services, and can generate gaps during the DRX .period for real time services.

In this way, according to Embodiment 1, gap mode is started according to the task starting time and task duration included in a gap assisted measurement task, and gaps are generated based on the total length of gaps included in the gap assisted measurement task in gap mode that has been started, so that it is possible to perform autonomous gap allocation without decreasing the data transmission rate, thereby decreasing the throughput.

Embodiment 2

With Embodiment 2 of the present invention, a case will be explained where, when a terminal autonomously generates gaps in gap mode, the gap length and inter-gap distance are limited.

When the channel quality of a cell of a different carrier frequency or a different RAT from the serving cell is measured, a terminal needs to synchronize with this cell and identify this cell such that the terminal can measure the channel quality of this cell. For example, a cell search of three steps in FDD of UMTS is known as a cell specifying processing. The cell search of three steps performs slot synchronization in step 1, performs frame synchronization and code group identification in step 2 and performs scrambling code identification in step 3. After the cell search of three steps, the terminal can measure the channel quality of the specified cell.

One of the three steps in the cell search may be used again to measure another cell, so that, although not all of the three steps are necessary to measure the channel quality of a cell, these three steps must be performed at least once. Therefore, to adequately measure at least one cell, a gap must have a required gap length. This gap length is referred to as the "minimum gap length," and is represented by "Lmin."

By contrast with this, to use one of steps in a cell search again, the inter-gap distance must not be too long and therefore the maximum value of the inter-gap distance needs to be set. This maximum value of the inter-gap distance is referred to as the "maximum inter-gap distance," and is represented by "Dmax." For example, when many cells are measured, the Dmax value must be set to such a value that not only the next gap but also many gaps can utilize previous synchronization results. A terminal that moves at high speed moves to other cells frequently, and performs measurement more frequently. Accordingly, to improve the efficiency of measurement, it is necessary to utilize the previous synchronization result (that is, a short Dmax value) by a terminal at maximum. In view of this, the maximum inter-gap distance is set according to the moving speed of a terminal.

Further, Lmin and Dmax are adopted to generate gaps regardless of what service the terminal is currently receiving. By the way, as to real time services that produce a severe packet delay, there is another limit, that is, limit of the maximum gap length, represented by "Lmax," which is set according to the packet delay requirement for real time services.

Next, the operation of a terminal that executes a gap assisted measurement task will be explained using FIG. 9. Here, in FIG. 9, the same parts as in FIG. 5 will be assigned the same reference numerals as in FIG. 5 and overlapping explanation will be omitted.

Figure 9:
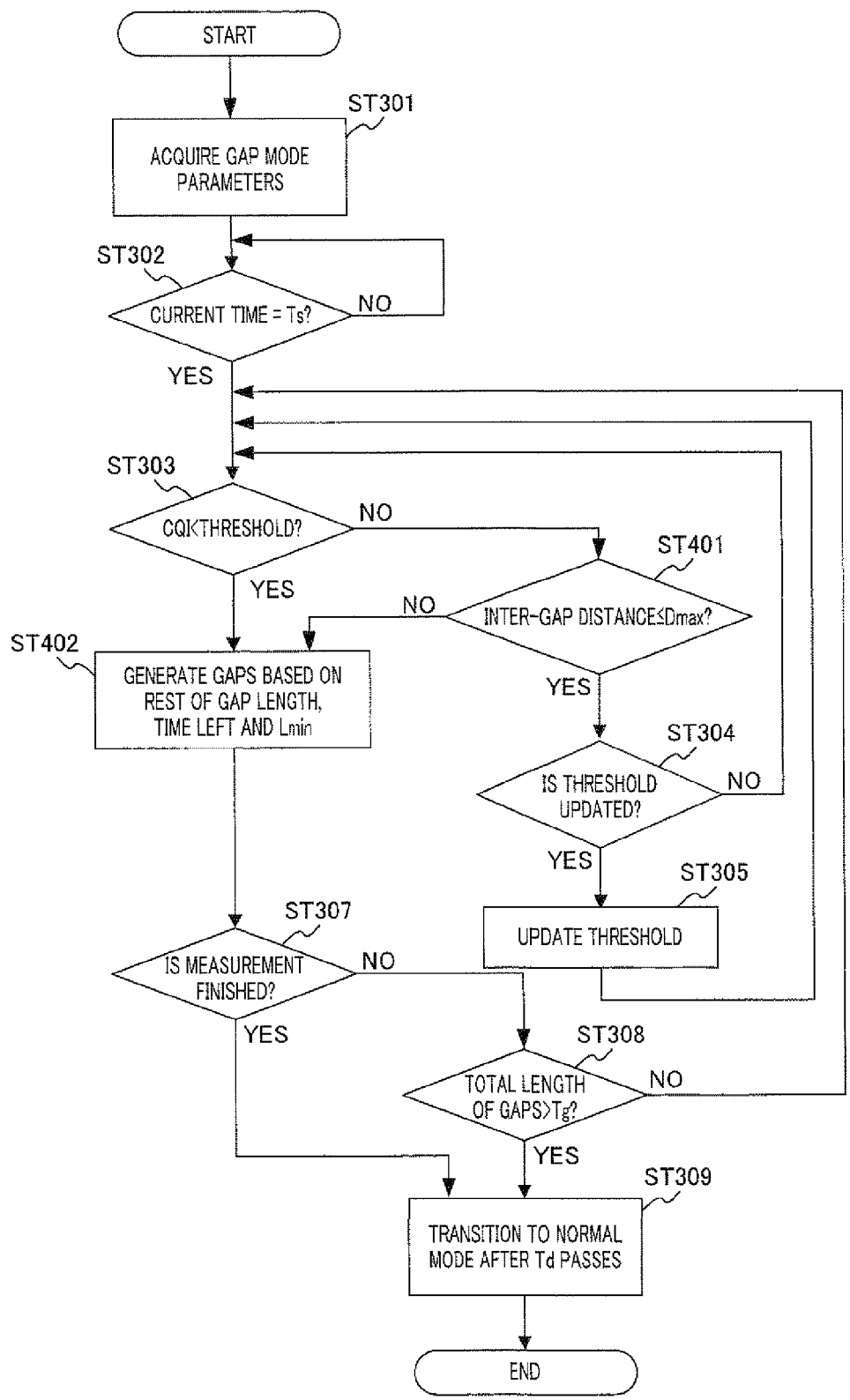
FIG. 9 is a flowchart showing the operation of a terminal that executes a gap assisted measurement task according to Embodiment 2 of the present invention.

In FIG. 9, in ST 401, whether or not the period between the previous gap and the current gap is within Dmax, is checked. If the period is within Dmax (Yes), the step proceeds to ST 304 and, if the period exceeds Dmax (No), the step proceeds to ST 402.

In ST 402, in addition to the rest of the gap length and the time left, Lmin is used to determine and generate gaps.

Further, Lmin and Dmax can be broadcasted from the network to a terminal in the network. Furthermore, Lmin and Dmax may be transmitted together with a gap assisted measurement task. Lmin and Dmax transmitted from the network are set at the same time when the terminal enters real time services.

Figure 10:
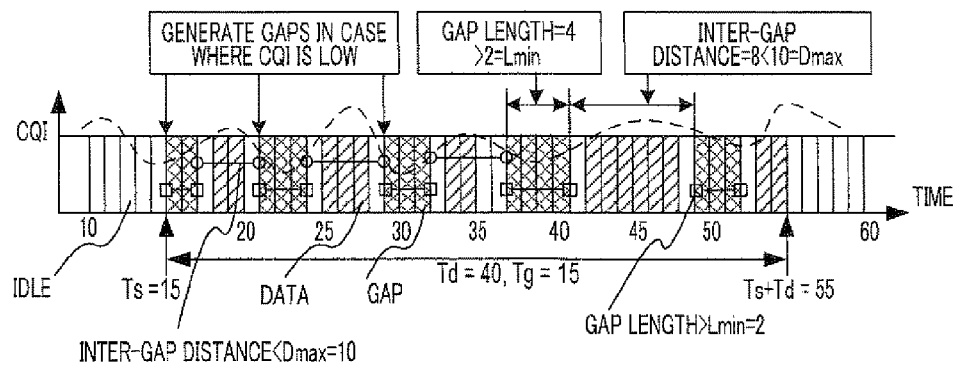
FIG. 10 illustrates gaps generated in gap mode of non-real time services.

Next, gaps generated in gap mode of non-real time services will be explained using FIG. 10. Here, the above parameters are set to Ts=15, Td=40, Tg=15, To="start," Lmin=2 and Dmax=10. According to the allocated gap assisted measurement task, the terminal enters gap mode from time Ts=15.

First, the terminal detects that the CQI of the serving cell is low. At this time, Td is much greater than Tg, and therefore the terminal first generates a gap of length 2, which starts at T=15 and which is equal to or greater than Lmin=2.

When detecting that the channel quality of the serving cell is improved in subframes 17 to 20, the terminal resumes data transmission. The terminal continues monitoring the channel quality of the serving cell, and, when detecting again that the CQI of the serving cell is low, the terminal generates some more gaps. For example, when the CQI of the serving cell is low and the time left in gap mode is not too long, the terminal generates again a gap of length 3 which starts at T=21 and which is equal to or greater than Lmin=2, and further continues the same gap generation processing.

Although, at time T=40, the channel quality of the serving cell is good and the terminal decides that gaps are not necessary, Dmax=10 is set and therefore a gap starting from time T=49 is generated such that the inter-gap distance is 8 and Dmax is less than 10.

Next, gaps generated in gap mode of real time services in which persistent scheduling is performed, will be explained using FIG. 11. Persistent scheduling refers to allocating radio resources to a terminal at a regular time interval based on certain rules. For example, 2 subframes are allocated every 8 subframes to a terminal that receives real time services, and this allocation is performed every 80 subframes. Therefore, the terminal uses 2 subframes for data transmission every 8 subframes, and uses the rest of 6 subframes as a DRX period in which power consumption can be reduced. Here, the above parameters are set to Ts=15, Td=40, Tg=45, To="start," Lmin=2 and Dmax=10. Further, the maximum gap length is set to Lmax=6 (i.e. the duration of the DRX period with this example).

Figure 11:
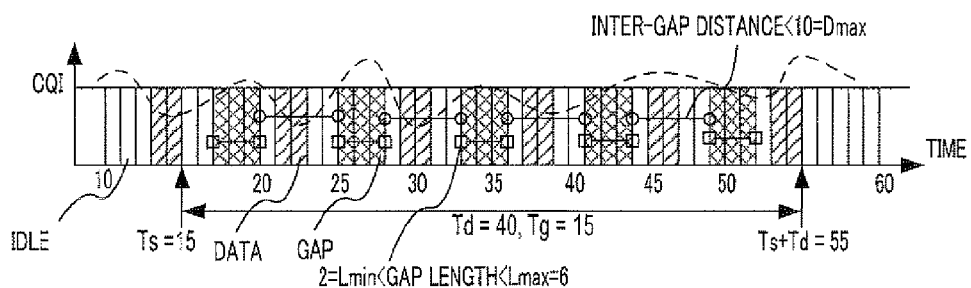
FIG. 11 illustrates gaps generated in gap mode of real time services in which persistent scheduling is performed.

FIG. 11 shows gaps generated in gap mode of real time services. Here, it can be seen that a simple fixed gap pattern is used and all gaps are generated in the DRX periods. That is, in the DRX period, 3 subframes are used for a gap every 6 subframes. This example indicates that the gap assisted measurement task does not exclude the use of a fixed gap pattern sequence.

Further, apart from gap generating methods in gap mode of non-real time services and real time services, the terminal may employ another gap generating method. Generally speaking, as to non-real time services, the gap generating method may depend on the instantaneous channel quality of the serving cell, and a terminal can generate gaps in periods in which the channel quality of the serving cell is low. As to real time services in which persistent scheduling is performed, gaps may be generated to overlap DRX periods without exceeding the maximum gap length, and a fixed gap pattern sequence that includes gaps overlapping the DRX periods can be used for simplification.

As explained in Embodiment 1, shared radio resource allocation is performed by a channel-aware packet scheduler. The channel-aware packet scheduler selects a terminal and allocates radio resources for data transmission, to the selected terminal per transmission time interval (for example, per subframe). The operator may determine arbitrarily the method of selecting a terminal and radio resource allocation method by a channel-aware packet scheduler.

The operation of a channel-aware packet scheduler targeting at a terminal in gap mode will be different from the operation targeting at a terminal in normal mode (that is, a terminal not in gap mode). The difference between these operations will be explained below. Generally, the operation of a channel-aware packet scheduler takes into account a terminal in normal mode during packet scheduling. Here, a particular terminal does not need to be selected at all times in a particular round of scheduling. Until this particular terminal reports that scheduling may be performed, using an indicator transmitted by this particular terminal, the channel-aware packet scheduler does not take into account this terminal in gap mode to perform packet scheduling.

Figure 12:
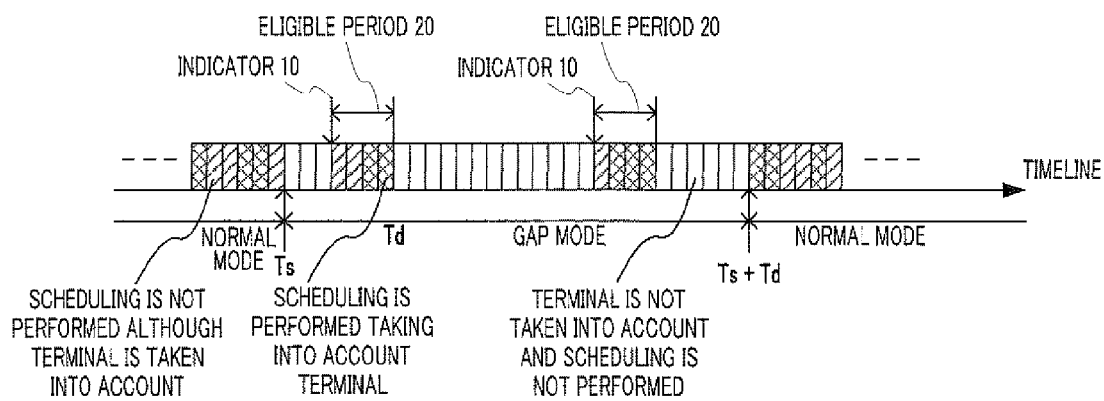
FIG. 12 compares the operation of a packet scheduler that targets at a terminal in normal mode and the operation of a packet scheduler that targets at a terminal in gap mode.

The operation of a packet scheduler targeting at a terminal in normal mode and the operation of the packet scheduler targeting at a terminal in gap mode will he compared using FIG. 12. As shown by FIG. 12, although this particular terminal may not necessarily be selected for data transmission, the packet scheduler needs to take into account the terminal in normal mode to perform packet scheduling per transmission time interval. By contrast with this, when the terminal is in gap mode, after the packet scheduler receives indicator 10 transmitted by this terminal, the packet scheduler does not take into account this particular terminal during eligible period 20. After the eligible period, the packet scheduler does not take into account scheduling of this particular terminal until the packet scheduler receives another indicator again.

Further, indicator 10 may be a CQI report of the serving cell, and the duration of eligible period 20 represented by "Te" may be defined in advance or transmitted together with the above gap assisted measurement task.

Figure 13:
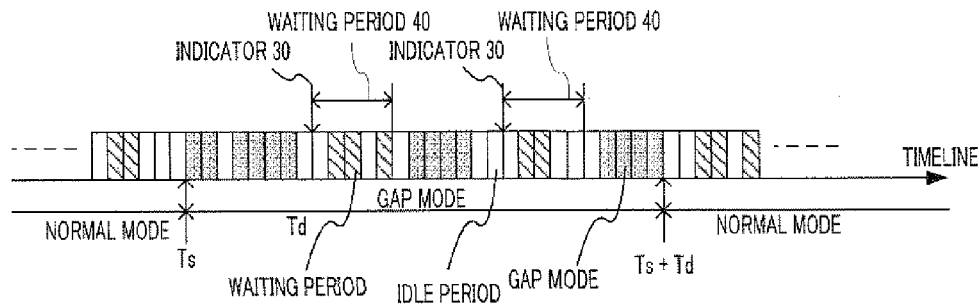
FIG. 13 shows the operation of a terminal in gap mode.

Further, the operation of a terminal in gap mode differs from the operation of a terminal in normal mode. As studied above, in addition to the operation related to the gap generating method in gap mode, the terminal in gap mode can resume its data transmission by transmitting an indicator to the network. Although the terminal stops generating gaps for a certain period after transmitting this indicator, the terminal re-tunes its receiving circuit to the frequency of the serving cell, and monitors scheduling determination information transmitted from the base station on a common control channel. If there are radio resources allocated to this particular terminal, the terminal performs normal data transmission according to this scheduling determination information. FIG. 13 shows the operation of a terminal in gap mode. If the terminal in gap mode needs to resume data transmission, the terminal transmits indicator 30 and, during waiting period 40 immediately after this indicator is transmitted, the terminal monitors the channels for scheduling determination information and resumes data transmission according to this scheduling determination information.

Further, indicator 30 transmitted from the terminal in gap mode may be a CQI report of the serving cell and the duration of waiting period 40 represented by "Tw," may be defined in advance or transmitted together with the above gap assisted measurement task. A delay is produced between the time the terminal transmits an indicator and the time the network receives the indicator, the relationship of Tw>Te is required to compensate for this delay. Here, the difference between Tw and Te must be made small as much as possible.

Further, although a terminal in gap mode generates all the required gaps (that is, generates all Tg gaps) according to the requirement of the received gap assisted measurement task, the rest of the gap duration is still long. In this case, the terminal may transmit the above indictor continuously to resume its data transmission.

Further, a terminal in gap mode can report the measurement result according to the measurement report decision criteria and the measurement report quality indicated in the measurement configurations. The method of reporting a measurement result may be performed periodically or may be event-triggered, and the methods used in UMTS can be re-used. These methods are existing techniques and detailed explanation thereof will be omitted here.

According to Embodiment 2, by setting minimum gap length Lmin and maximum inter-gap distance Dmax, it is possible to secure the gap length required for measurement and avoid the situation where measurement is not performed for a long time.

Embodiment 3

Multiple task management will be explained with Embodiment 3 of the present invention.

Generally, the network transmits a gap assisted measurement task to perform handover, and can transmit a new task after the current task is finished. For example, the network selects inter-frequency handover rather than inter-RAT handover for a terminal that needs to be handed over. First, the network transmits a task for inter-frequency handover. Then, inter-RAT handover is also applicable and, if the network demands the terminal to perform inter-RAT measurement, then the network may transmit a new task after the current task is finished.

Figure 14:
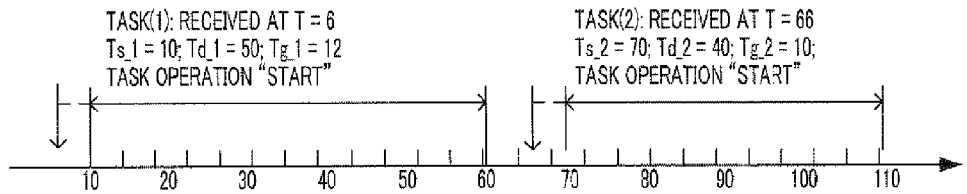
FIG. 14 shows how a new task is allocated after a current task is finished.

FIG. 14 shows that a new task is allocated after the current task is finished. Although the network generally transmits a single task to perform handover, there are cases where the network transmits a new task in the task duration of the current task. In these cases, multiple task management is required, and the parameter "To" in a gap assisted measurement task is used to manage multiple tasks.

The network transmits a second task (i.e. the new task) in the task duration of the first task (i.e. the current task) and, demands that a second task start as soon as possible without any negative influence on the operation of the first task. In this case, the second task can start immediately after all the gaps in the first task are generated. However, as to a terminal that generates gaps by autonomous gap allocation in gap mode, the network cannot learn the exact time all the gaps in the current task are generated. The network can transmit a second task that is activated after the current task is finished. For example, Ts_1 and Td1 represent the starting time and the task duration of the first task, respectively. At this time, starting time Ts_2 of the second task may be set as Ts_2=Ts_1+Td_1. Note that the second task may be transmitted at an arbitrary time between time Ts_1 and time Ts_2.

Figure 15:
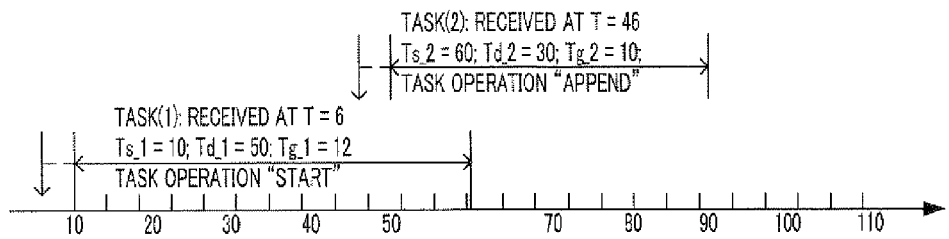
FIG. 15 shows that a second task including To="app end" is transmitted in the task duration of the first task.

To start the second task as soon as possible, the network sets the parameter "To"="append" to specify the method of operating the second task when the first task is not finished. FIG. 15 shows that a second task including To="append" is transmitted in the task duration of the first task. In case of this "append," the network may not recognize the exact starting time of the second task. Accordingly, the network uses the period from time Ts_2 to time Ts_2+Td_2 as the task duration of the second task. Note that this does not influence data transmission by the terminal even if the network had generated all the Tg_2 gaps before time Ts_2+Td_2. This is because the network can use the above method of transmitting indices to resume data transmission in the period from the actual starting time to time Ts_2+Td_2.

Figure 16:
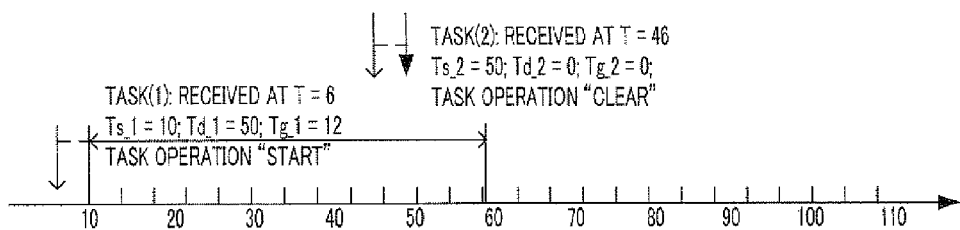
FIG. 16 shows that a second task including To="clear" is transmitted in the task duration of the first task.

There are cases where a terminal to which a gap assisted measurement task is allocated finishes required measurement without using all the allocated Tg gaps. In these cases, the terminal cannot clear un-used gaps without a command from the network. That is, even if the terminal already generates a required measurement result before the terminal does not finish gaps, unless the terminal has received any command from the network to clear the un-used gaps, the terminal will generate the rest of gaps. Then, the network commands the terminal to clear the un-used gaps and clear the ongoing task. To be more specific, there are cases where, if the terminal reports a measurement result before the task duration expires, the network can decide that it is no longer necessary to measure the first task. In this case, it is possible to transmit the second task that includes the same measurement identification information as the first task, and set the parameter "To" to "clear" used to clear all the tasks stored in a terminal with the same measurement identification information as the second task, at the time defined by Ts transmitted in the second task. FIG. 16 shows that the second task including To="clear" is transmitted in the task duration of the first task.

The network can transmit a second task in the task duration of the first task including the parameter "To"="start." Note that the network sets the starting time of this second task adequately. In this case, the starting time of this second task must be set after the time the first task is finished. For example, Ts_1 and Td_1 represent the starting time and the task duration of the first task, respectively. Then, the starting time of the second task must he set as Ts_2=Ts_1+Td_1. Note that the second task may be transmitted at an arbitrary time between time Ts_1 and Ts_2.

Figure 17:
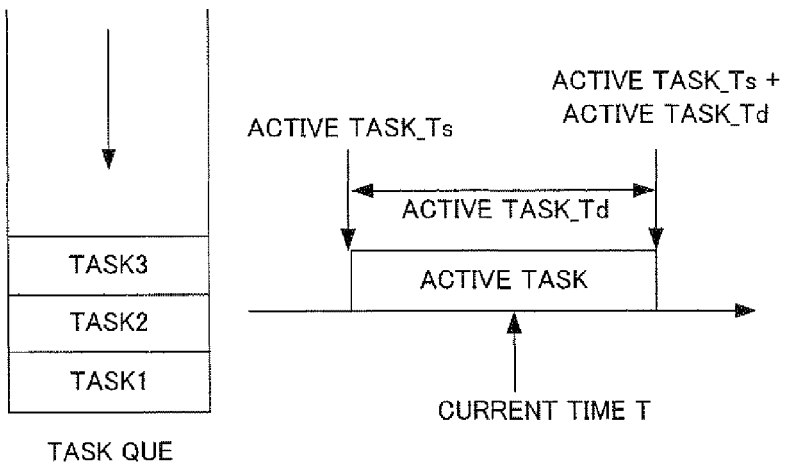
FIG. 17 shows two variables and current time T.

How a terminal operates a plurality of tasks will be explained in detail below. A terminal maintains two variables related to the operation of tasks. One variable, that is, a task queue represented by "TaskQue," is used to maintain the queue storing the received gaps sorted at the starting time. Further, the other variable, that is, an active task represented by "ActiveTask," is used to manage the task of the ongoing operation. FIG. 17 shows the two variables and current time T.

The TaskQue operating method by a terminal when a new task comes to time T will be explained below using FIG. 18. Further, it is assumed that the starting time is set from an integer range [0, maxCFN (Connection Frame Number where maxCFN=255 holds in UMTS)].

Figure 18:
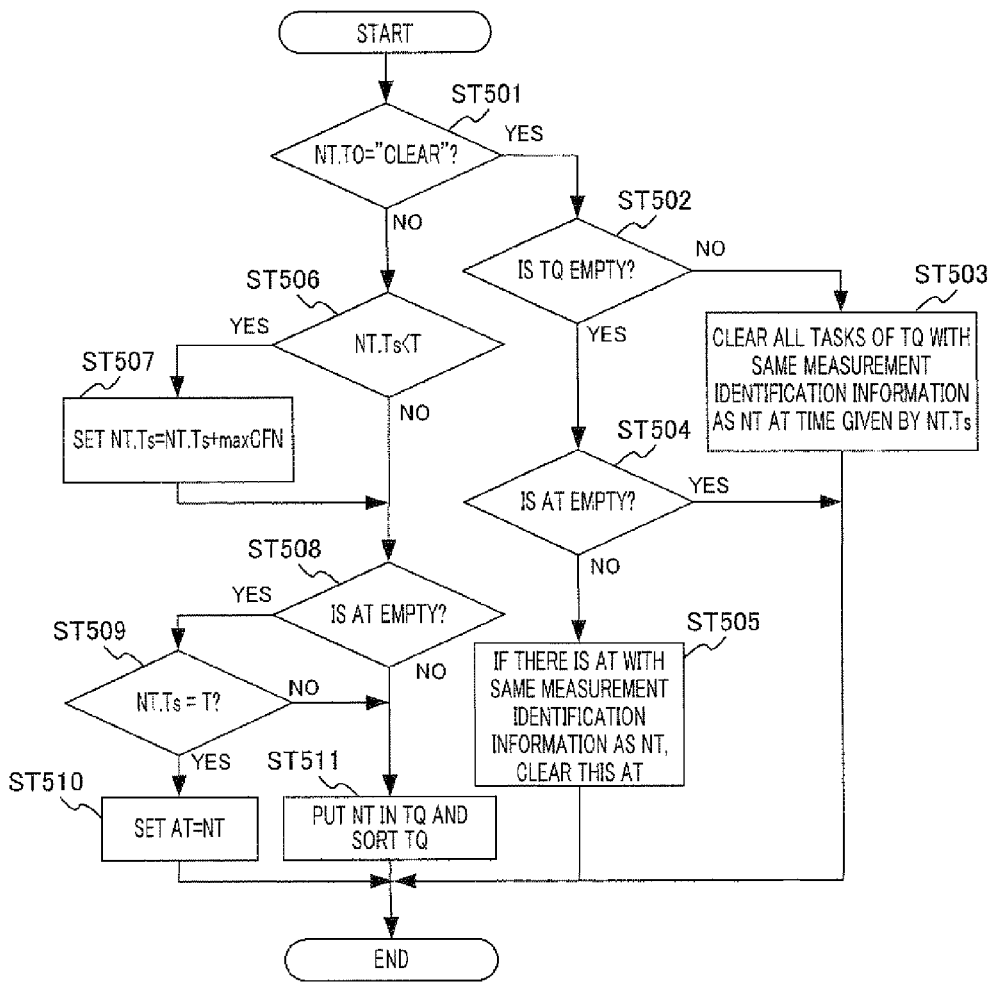
FIG. 18 illustrates a TaskQue operation method of a terminal.

In FIG. 18, in ST 501, whether or not the parameter "To" for a new task (NT.TO:New Task. Task Operation)="clear" holds is decided, and, if NT.TO="clear" does not hold (Yes), the step proceeds to ST 502. If NT.TO="clear" does not hold (No), the step proceeds to ST 506.

In ST 502, whether or not TaskQue is empty is decided, and, if TaskQue is not empty (No), the step proceeds to ST 503 to clear all the tasks of TaskQue that includes the same measurement identification information as the new task ("NT") and finish processing. If TaskQue is empty (Yes), the step proceeds to ST 504.

In ST 504, whether or not ActiveTask ("AT") is empty is decided, and, if ActiveTask is empty (Yes), processing is finished and, if ActiveTask is empty (No), the step proceeds to ST 505.

In ST 505, if there is ActiveTask that includes the same measurement identification information as a new task ("NT"), this ActiveTask is cleared.

In ST 506, if it is decided in ST 501 that NT.TO="clear" does not hold, that is, if the parameter "To" of the new task="start" or "append" holds, whether or not the parameter "Ts<T" of the new task is satisfied is decided. If Ts<T is satisfied (Yes), the step proceeds to ST 507 and, if Ts<T is not satisfied (No), the step proceeds to ST 508.

In ST 507, the parameter "Ts" for the new task=the parameter "Ts+maxCFN" for the new task is set, and, in ST 508, whether or not ActiveTask is empty is decided. If ActiveTask is empty (Yes), the step proceeds to ST 509, and, if ActiveTask is not empty (No), the step proceeds to ST 511.

In ST 509, whether or not the parameter "Ts" for the new task=T holds is decided, and, if Ts=T holds (Yes), the step proceeds to ST 510 and, if Ts=T does not hold, the step proceeds to ST 511. In ST 510, ActiveTask=new task is set and processing is finished.

In ST 511, the new task is put in TaskQue and all the tasks of TaskQue are sorted, and processing is finished.

Further, the parameter "Ts" is calculated as above such that the parameter "Ts" for the new task=the parameter "Ts+maxCFN" for the new task holds. As one example, it is possible to set maxCFN such that the parameter "Ts" for the new task=the current time holds.

Figure 19:
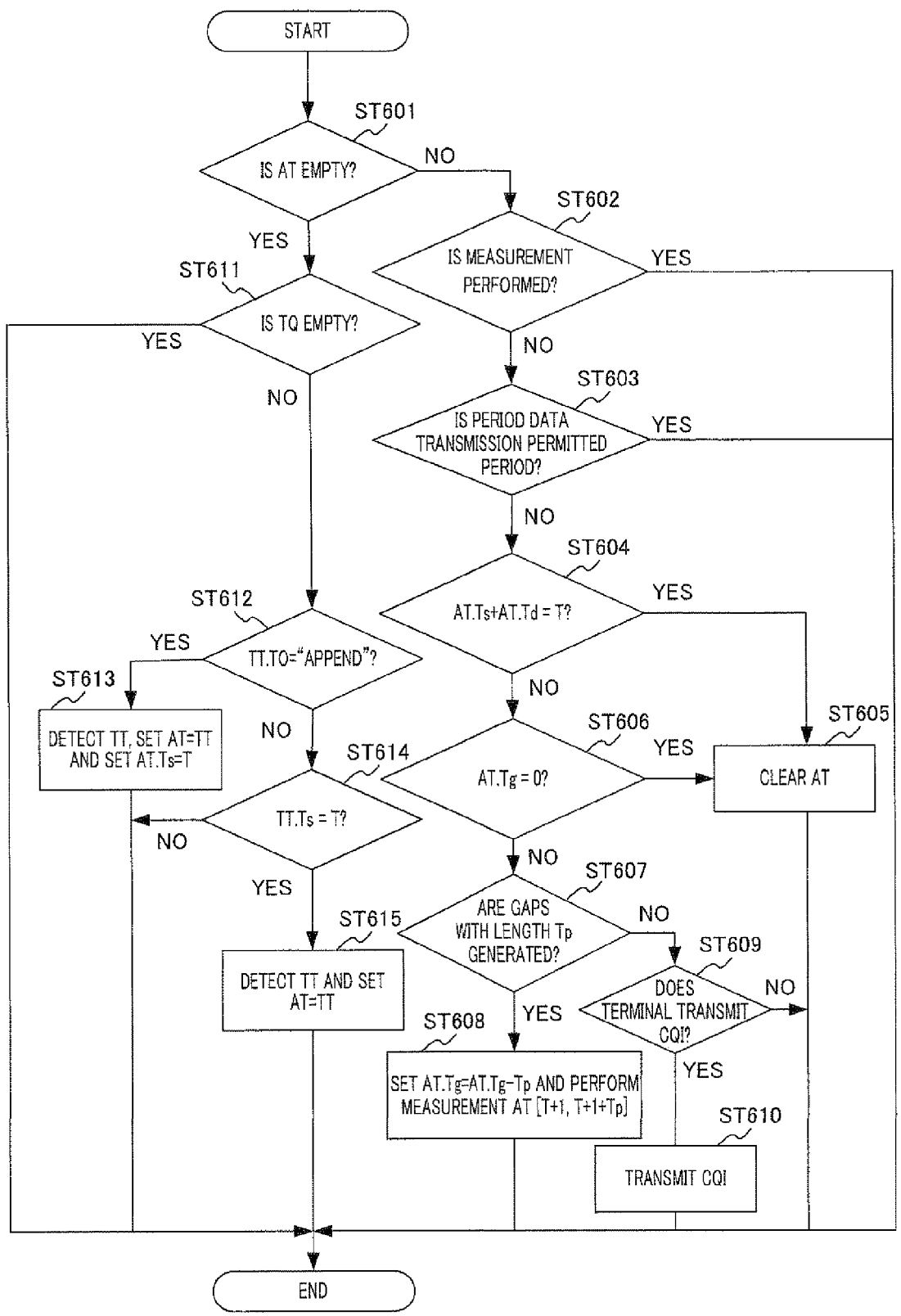
FIG. 19 illustrates an ActiveTask operation method of a terminal at time T.

The ActiveTask operating method of a terminal at time T will be explained using FIG. 19. In FIG. 19, in ST 601, whether or not ActiveTask ("AT") is empty is decided, and, if ActiveTask is empty (Yes), the step proceeds to ST 611 and, if ActiveTask is not empty (No), the step proceeds to ST 602.

In ST 602, whether or not measurement is performed is decided, and, if measurement is performed (Yes), processing is finished and, if measurement is not performed (No), the step proceeds to ST 603.

In ST 603, whether or not the period is a data transmission permitted period, and, if the period is the data transmission permitted period (Yes), the processing is finished, and, if the period is not data transmission permitted period (No), the step proceeds to ST 604.

In ST 604, whether or not ActiveTask.Ts+ActiveTask.Td=T holds is decided, and, if AT.Ts+AT.Td=T holds (Yes), the step proceeds to ST 605 to clear ActiveTask and finish processing. Further, if AT.Ts+AT.Td=T does not bold (No), the step proceeds to ST 606.

In ST 606, whether or not ActiveTask.Tg=0 holds is decided, and, if AT.Tg=0 holds (Yes), the step proceeds to ST 605 to clear ActiveTask and finish processing. Further, if AT.Tg=0 does not hold (No), the step proceeds to ST 607.

In ST 607, whether or not a terminal generates gaps of length Tp is decided, and, if the terminal generates gaps (Yes), the step proceeds to ST 608 and, if the terminal does not generate gaps (No), the step proceeds to ST 609.

In ST 608, ActiveTask.Tg=ActiveTask.Tg−Tp is set and is measured in a subframe [T+1, T+1+Tp], and processing is finished.

In ST 609, whether or not the terminal transmits a CQI is decided, and, if the terminal transmits a CQI (Yes), the step proceeds to ST 610 and the terminal transmits the CQI to the network at time T+1. If the terminal does not transmit a CQI (No), the processing is finished.

In ST 611, whether or not TaskQue is empty is decided, and, if TaskQue is empty (Yes), processing is finished and, if TaskQue is not empty (No), the step proceeds to ST 612.

In ST 612, whether or not TopTask.TaskOperation="append" holds is decided, and, if TT.TO="append" holds (Yes), the step proceeds to ST 613 and, if TT.TO="append" does not hold (No), the step proceeds to ST 614.

In ST 613, TopTask is detected, ActiveTask=TopTask is set, ActiveTask.Ts=T is set and processing is finished.

In ST 614, whether or not TopTask.Ts=T holds is decided, if TT.Ts=T holds (Yes), the step proceeds to ST 615 and, if TT.Ts=T does not hold (No), processing is finished.

In ST 615, TopTask is detected, ActiveTask=TopTask is set, ActiveTask.Ts=T is set and processing is finished.

In this way, according to Embodiment 3, even in case where, in gap mode, a terminal generates gaps by autonomous gap allocation, by changing the setting of the parameter "To" in a gap assisted measurement task, it is possible to transmit a second task (i.e. new task) in the task duration of the first task (i.e. current task) and start the second task as soon as possible without a negative influence on the operation of the first task.

The disclosure of Japanese Patent Application No. 2007-145901, filed on May 31, 2007, including the specification, drawings and abstract, is incorporated herein by reference in its entirety.

Industrial Applicability

The gap assisted measurement method according to the present invention can perform autonomous gap allocation without decreasing the data transmission rate, thereby decreasing throughput, is applicable to, for example, a mobile communication system.

The invention claimed is:

1. A gap assisted measurement method comprising:
   acquiring a gap assisted measurement task that is transmitted from a base station apparatus and that commands a gap assisted measurement method;
   starting gap mode according to a starting time of the gap assisted measurement task included in the gap assisted measurement task and a duration of the gap assisted measurement task; and
   generating, in the started gap mode, a gap based on a total length of gaps included in the gap assisted measurement task.

2. The gap assisted measurement method according to claim 1, wherein the gap mode is limited by a minimum gap length and a maximum inter-gap distance.

3. The gap assisted measurement method according to claim 2, where the minimum gap length and the maximum inter-gap distance are transmitted by a broadcast message from the base station apparatus to a communication terminal apparatus.

4. The gap assisted measurement method according to claim 1, wherein the gap assisted measurement task is transmitted from the base station apparatus to a communication terminal apparatus by signaling through a dedicated channel.

5. The gap assisted measurement method according to claim 1, wherein the starting time of the gap assisted measurement task is set taking into account a maximum delay time produced between transmission of the gap assisted measurement task from the base station apparatus and acquisition of the gap assisted measurement task.

6. The gap assisted measurement method according to claim 1, wherein the total length of gaps is set to a same length as a total length of gaps according to a predetermined gap pattern sequence.

7. The gap assisted measurement method according to claim 1, wherein the duration of the gap assisted measurement task is set based on a current situation of network load, delay requirement for handover, an instantaneous channel state of a terminal and a quality of service requirement.

8. The gap assisted measurement method according to claim 1, wherein the duration of the gap assisted measurement task is set to a same length as a predetermined gap pattern sequence.

9. The gap assisted measurement method according to claim 1, wherein the base station apparatus generates the gap by variable gap allocation or fixed gap allocation.

10. The gap assisted measurement method according to claim 1, wherein the base station apparatus does not schedule data transmission until a communication terminal apparatus is commanded to transmit data in the gap mode.

11. The gap assisted measurement method according to claim 10, wherein the base station apparatus schedules the data transmission to the communication terminal apparatus during an eligible period that starts after an indicator transmitted from the communication terminal apparatus in the gap mode is acquired.

12. The gap assisted measurement method according to claim 11, wherein the indicator comprises a channel quality indicator.

13. The gap assisted measurement method according to claim 1, wherein, when a new task is transmitted in the duration of the gap assisted measurement task, the base station apparatus sets a starting time of the new task after the duration of the gap assisted measurement task expires.

14. The gap assisted measurement method according to claim 1, wherein, when a new task is transmitted in the duration of the gap assisted measurement task, the base station apparatus sets a task operation of the new task to "append," and a communication terminal apparatus starts the new task immediately after the gap assisted measurement task is finished.

15. The gap assisted measurement method according to claim 1, wherein, when a communication terminal apparatus finishes measurement before all gaps are generated or before the duration of the gap assisted measurement task expires, the base station apparatus sets a task operation of a new task to "clear," and the communication terminal apparatus finishes the gap assisted measurement task.

* * * * *